(12) United States Patent
Altamura et al.

(10) Patent No.: US 8,333,349 B2
(45) Date of Patent: Dec. 18, 2012

(54) METHOD AND APPARATUS FOR SUPPLYING A TRACK CIRCUIT

(75) Inventors: Renato Altamura, Carasco (IT); Daniele Trentini, Chiavari (IT)

(73) Assignee: Sirti S.p.A., Milan (IT)

( * ) Notice: Subject to any disclaimer, the term of this patent is extended or adjusted under 35 U.S.C. 154(b) by 0 days.

(21) Appl. No.: 12/998,671

(22) PCT Filed: Nov. 18, 2009

(86) PCT No.: PCT/IB2009/007507
§ 371 (c)(1), (2), (4) Date: Aug. 2, 2011

(87) PCT Pub. No.: WO2010/058270
PCT Pub. Date: May 27, 2010

(65) Prior Publication Data
US 2011/0284697 A1    Nov. 24, 2011

(30) Foreign Application Priority Data

Nov. 21, 2008 (IT) .............................. MI2008A2089

(51) Int. Cl.
*B61L 27/00* (2006.01)
(52) U.S. Cl. ................................. 246/4; 246/5
(58) Field of Classification Search ............ 246/4, 34 B, 246/34 A, 5, 6
See application file for complete search history.

(56) References Cited

U.S. PATENT DOCUMENTS

| 3,571,667 | A | * | 3/1971 | Demeur | 361/182 |
| 3,794,977 | A | * | 2/1974 | Thorne-Booth et al. | 340/12.18 |
| 4,217,643 | A | * | 8/1980 | Anderson et al. | 701/20 |
| 4,680,663 | A | * | 7/1987 | Nogi et al. | 361/2 |
| 5,346,163 | A | * | 9/1994 | Momma et al. | 246/5 |
| 6,348,777 | B1 | * | 2/2002 | Brown et al. | 320/160 |
| 6,681,161 | B1 | * | 1/2004 | Gordon et al. | 701/20 |
| 7,397,149 | B2 | * | 7/2008 | Seddiki et al. | 307/62 |
| 2011/0284697 | A1 | * | 11/2011 | Altamura et al. | 246/4 |

FOREIGN PATENT DOCUMENTS

| DE | 35 27 309 A1 | 2/1987 |
| EP | 1 354 752 A | 10/2003 |
| JP | 61 200037 A | 9/1986 |
| JP | 61-200038 A | 9/1986 |

OTHER PUBLICATIONS

International Search Report Dated Jun. 1, 2011.

* cited by examiner

*Primary Examiner* — Jason C Smith

(74) *Attorney, Agent, or Firm* — Hedman & Costigan, P.C.; James V. Costigan

(57) ABSTRACT

An apparatus for supplying a track circuit in a railway line provided with a plurality of track circuits adjacent to one another and electrically insulated from one another. Said circuit comprises a pair of rails (R) formed by parallel metal bars (B) and a transmission block (2), capable of supplying the track circuit via a voltage generator designed to cause a current to flow in the circuit, it being possible for information to be associated to said current signal via a predetermined code. Said current delivered and absorbed by the circuit is detectable by a detection device provided on board a train that is travelling along that track circuit.

7 Claims, 1 Drawing Sheet

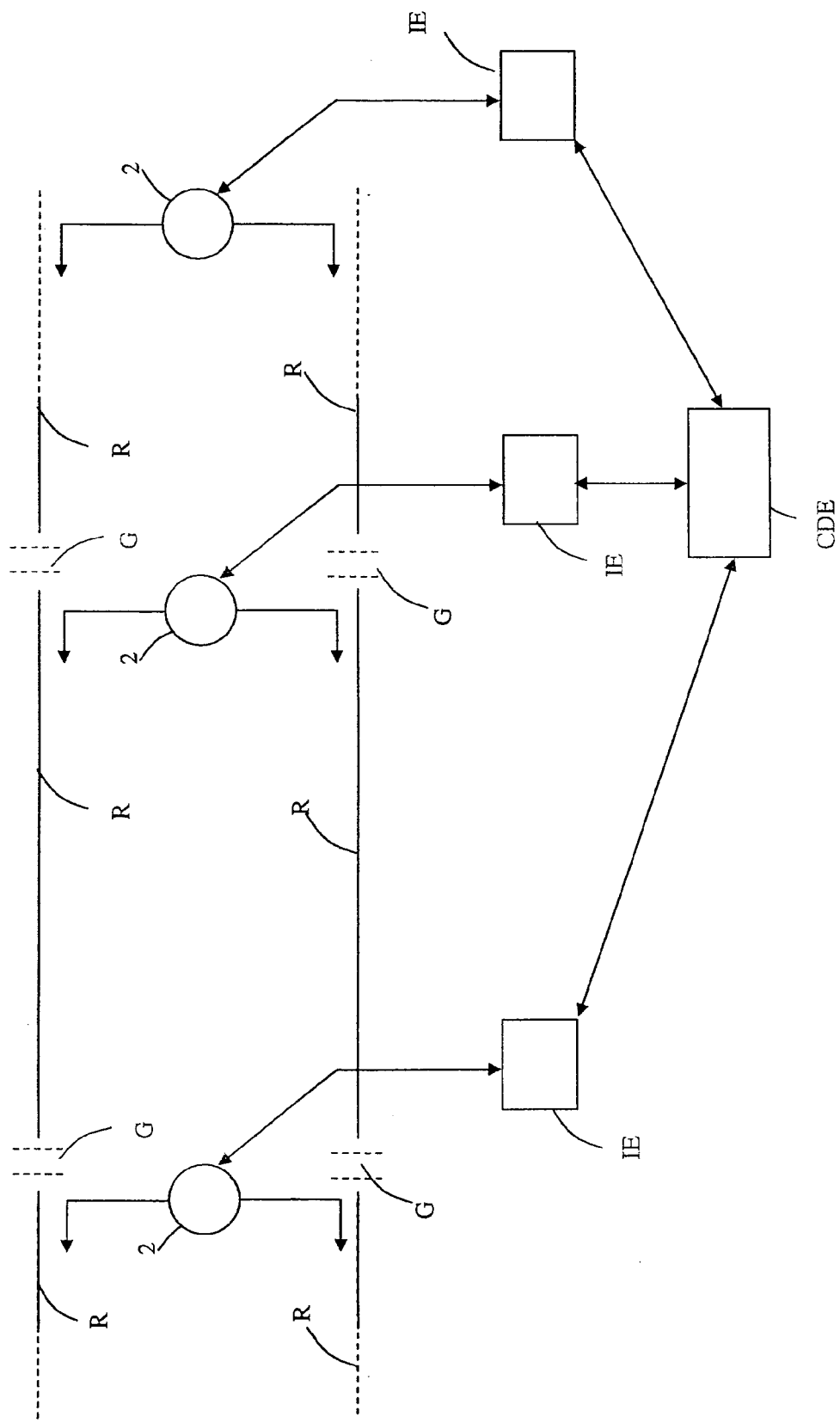

METHOD AND APPARATUS FOR SUPPLYING A TRACK CIRCUIT

The present invention relates to a method and apparatus for the supply of a track circuit.

According to railway jargon, a track circuit is a stretch of railway track of a variable length (from a few tens of metres to a few kilometres) electrically insulated from the adjacent stretches of railway track and with a low voltage applied on the set of the two rails. The application of the voltage on the electrified rails occurs at one end of the stretch of track and a current detector is applied in parallel to said point of supply. When there are no vehicles on that stretch of track, the detector extracts a zero current since the electrified rails are not short-circuited by the presence of the axles of the train, whereas in the case where any railway vehicle reaches that section of track, with its own axles it short-circuits the rails to one another and triggers a circulation of current that is detected by the counter. Said technology hence enables continuous production of information on the presence in a stretch of track of (stationary or travelling) vehicles, and as such is used for automating control of a railway line.

In the case where the so-called coded-current automatic block CCAB is active in the stretch of line considered, the current in the track circuit is modulated at different modulating frequencies, where associated to each modulating frequency (code) is a particular aspect of the fixed signals: in this way, it becomes possible to transmit, along the railway track, given information in the form of electric current. Said current is captured, by the trains that are travelling along the track, via a detector device, for example of the inductive-coupling type, provided in the proximity of the first axle.

In order for the code transmitted on the current sent to the track circuit to be detected correctly on board the train, it is necessary for the current on the axle of the train equipped with the magnetic detector (i.e., the first axle of the train) to be not less than a limit value (typically 3 A).

The current delivered by the generator will be higher than the current on the first axle of the train as a result of the resistance of dispersion between the insulating joints and as a result of the impedance of dispersion between the rails (which depends, for example, upon the state of the roadbed).

As the train, proceeding on its way, approaches the transmitter, which is set at one end of the track circuit, the impedance of the circuit decreases and hence the current delivered by the transmitter rises until it reaches the maximum value when the axle of the train is position precisely on the transmitter itself. The need to guarantee at all times the minimum current on the first axle of the train, equipped with the detector, even in conditions of a long stretch of railway track and with high dispersions between the two rails, entails the need to deliver a high amount of current and hence have a generator that is capable of supplying high voltage values but is, however, equipped with a resistance in series that has the function of limiting the excess current when the axle of the train is positioned above the generator.

With this system, the power that is delivered is much higher than what is necessary for guaranteeing the minimum current on the first axle of the train.

In this way, the power delivered by the transmitter is much higher than the one necessary for guaranteeing the minimum current on the first axle of the train with all the impact that this involves in terms of thermal dissipation, mean time between failures (MTBF), availability.

The purpose of the present invention is to overcome the aforesaid drawbacks by providing an apparatus capable of regulating the current delivered by the transmitter (at the same guaranteeing, in the worst case, the minimum current on the first axle of the train) by acting, without introducing distortions on the codes sent, on the voltage value supplied by the transmitter. One aspect of the present invention regards an apparatus according to Claim 1.

A further aspect of the current invention regards a method where a step of varying an applied voltage comprises increasing the applied voltage by a predetermined amount if the value of current is less than at least one predetermined lower threshold value and reducing the applied voltage by a predetermined amount if the value of the absorbed current is higher than at least one predetermined upper threshold value.

The characteristics and advantages of the method and apparatus according to the present invention will emerge more clearly from the ensuing description, provided by way of non-limiting example, of one embodiment, with reference to the attached FIGURE, which represents a block diagram of the apparatus according to the present invention.

With reference to the aforesaid FIGURE, the apparatus according to the present invention is applied on a track circuit 1, which basically comprises a pair of rails R formed by parallel metal bars B which are normally T-shaped, mounted transversely with respect to a load-bearing structure formed by sleepers made of wood, steel, or cement. Each track circuit is separated from the adjacent one by electrically insulating joints G. In a railway line, a plurality of adjacent track circuits are present insulated from one another.

Present in each track circuit is a transmission block 2 capable of transmitting a voltage signal to the circuit. As described previously, a code is associated to said voltage via a frequency modulation or other similar system.

Said voltage signal, superimposed on or associated to which is the code word, can be the traditional 50-Hz or 83.3-Hz voltage signal that is used for detecting the passage of the train on that particular track circuit or else can be a specific voltage signal generated for the purpose.

The voltage delivered must be such that, whatever the position of the detection device set on board the train with respect to the stretch of track of the circuit, the current that the device detects must not be less than a predetermined value (for example, 3 A) that guarantees proper decoding of the codes associated to the current signal.

Each track circuit is controlled by an interface card IE, which in turn is controlled by a microprocessor electronic card referred to as plant controller CdE. Said card controls the voltage delivered by the voltage generator of the track circuit, via the interface card, and monitors parameters used for regulating the voltage to be delivered.

The apparatus according to the present invention operates in the following way.

The plant-controller electronic card CdE detects the current delivered (for example, at predetermined instants) in each track circuit controlled by said card, the values of which are stored in a purposely provided memory of the card.

On the basis of said values, the electronic card decides whether to intervene on the regulation of the voltage supplied by the voltage generator of the track circuit.

For said purpose, calibration or threshold values are stored in the plant-controller electronic card. Preferably, there is stored the voltage value $V_{MAX}$, which is the effective value of maximum voltage that can be delivered by the transmitter, for guaranteeing in the worst operating conditions the minimum current on the axle of the train sufficient for detection of the codes on board the train.

Also stored is the effective current value $I_{INF}$, which is the minimum current delivered by the plant-controller electronic card such as to guarantee the minimum current on the axle of the train sufficient for detection of the codes on board the train in the worst operating conditions (maximum length and maximum dispersions).

Likewise stored is the value $I_{MAX}$, which is the maximum current that can be delivered by the card.

When the train is not present on the track circuit in question, the voltage supplied by the interface card assumes the value $V_{MAX}$. In these conditions, the current delivered by the card and absorbed by the circuit has an effective value lower than the value $I_{INF}$, and consequently no action is undertaken on the voltage delivered.

When the train enters the track circuit in question the voltage delivered by the interface card has the value V. In these conditions, the current delivered by the card has an effective value higher than the value $I_{INF}$ but lower than the value $I_{MAX}$. Hence, in said situation the detection device on board the train is able to detect the current from the track circuit properly in order to read the associated codes.

When the train is travelling within the track circuit in question the impedance seen by the voltage generator of the interface card decreases in value; hence, the current absorbed by the circuit tends to increase, and as long as its value does not exceed the value $I_{MAX}$ no action is undertaken on the voltage delivered.

If, instead, the current delivered by the card and absorbed by the circuit exceeds the value $I_{MAX}$, the plant controller carries out an action on the supplied voltage, reducing it by a predetermined amount (for example, one sixteenth of $V_{MAX}$).

When the train that is travelling starts to exit from the track circuit in question, the impedance seen by the voltage generator of the plant-interface card tends to remains stable.

If in these conditions the current delivered by the card has an effective value higher than the value $I_{INF}$ but lower than the value $I_{MAX}$ no action is undertaken on the voltage delivered.

If, instead, the current delivered by the card drops below the value $I_{MIN}$, an action of correction is carried out by the plant-controller card on the voltage delivered, which is increased by a predetermined amount.

In practice, regulation of the current delivered occurs according to a stepwise pattern, in which the voltage generated by the generator of the track circuit is increased or decreased by one or more predetermined voltage amounts in response to overstepping of the (upper and lower) thresholds indicated above. Alternatively, the control could be carried out exactly as required by reducing or increasing continuously the value of the voltage delivered by the generator in response to increases or reductions in the current absorbed by the track circuit, even when the current does not exceed the thresholds referred to above. In a further alternative, a number of consecutive threshold values can be envisaged for which the corrective action of intervention on the voltage delivered is determined in order to optimize the total delivered power.

The invention claimed is:

1. An apparatus for supplying track circuits in a railway line provided with a plurality of individual track circuits adjacent to one another and electrically insulated from one another, each individual track circuit comprising a pair of rails (R) and a transmission block (2), capable of supplying that individual track circuit with a voltage which causes a current to flow in that individual track circuit, said current that is delivered and absorbed by that individual track circuit being detectable on board a train that is traveling along that individual track circuit, said apparatus being characterized in that it comprises at least one plant-controller electronic card (CdE) of that individual track circuit, which is designed to detect the current absorbed by that individual track circuit and delivered by the transmission block (2) and to increase the voltage supplied by a predetermined amount if a value of said current that is delivered and absorbed is lower than a value of at least one predetermined lower threshold value and to reduce the voltage supplied by a predetermined amount if the value of said current that is delivered and absorbed is higher than at least one predetermined upper threshold value.

2. The apparatus according to claim 1, wherein the lower threshold value of the current that is delivered and absorbed is a minimum value ($I_{MIN}$) of current delivered by the plant-controller electronic card, such as to guarantee a minimum current on an axle of the train that is sufficient for detection of the codes on board the train under worst conditions.

3. The apparatus according to claim 1, wherein the upper threshold value of the current that is delivered and absorbed is the maximum value ($I_{MAX}$) of the current that can be delivered by the plant-controller card.

4. The apparatus according to claim 1, wherein said predetermined amount corresponds to one sixteenth of a maximum voltage that can be delivered ($V_{MAX}$) by the transmission block (2).

5. The apparatus according to claim 1, wherein regulation of the current delivered occurs according to a stepwise pattern.

6. A method for supplying track circuits in a railway line provided with a plurality of individual track circuits adjacent to one another and electrically insulated from one another, each individual circuit comprising a pair of rails (R) and a transmission block (2), capable of supplying that individual track circuit with an applied voltage designed to cause a current to flow in that individual track circuit, said current delivered and absorbed by the circuit being detectable on board a train that is traveling along that individual track circuit, said method being characterized in that it comprises the following steps:
   (a) measuring the current delivered by an applied voltage and absorbed by the track circuit to obtain a value;
   (b) comparing the value measured in step (a) with at least one predetermined threshold value; and
   (c) varying a value of the applied voltage by by a predetermined amount to the individual track circuit according to said comparison.

7. The method according to claim 6, wherein said step of varying comprises a step of increasing the applied voltage by a predetermined amount if the value of current obtained in step (a) is less than at least one predetermined lower threshold value and reducing the applied voltage by a predetermined amount if the value of said absorbed current is higher than at least one predetermined upper threshold value.

* * * * *